United States Patent
Smillie et al.

(10) Patent No.: US 8,932,691 B2
(45) Date of Patent: Jan. 13, 2015

(54) MULTILAYER PROTECTIVE LINER

(75) Inventors: Benjamin Andrew Smillie, Kingston (CA); Sassan Hojabr, Kingston (CA); John D. Vansant, Avondale, PA (US); Qin Lin, Kingston (CA)

(73) Assignee: E I du Pont de Nemours and Company, Wilmington, DE (US)

( * ) Notice: Subject to any disclaimer, the term of this patent is extended or adjusted under 35 U.S.C. 154(b) by 58 days.

(21) Appl. No.: 13/413,208

(22) Filed: Mar. 6, 2012

(65) Prior Publication Data

US 2013/0065000 A1 Mar. 14, 2013

Related U.S. Application Data

(60) Provisional application No. 61/449,762, filed on Mar. 7, 2011.

(51) Int. Cl.
| | |
|---|---|
| B32B 1/08 | (2006.01) |
| B32B 27/30 | (2006.01) |
| B32B 15/08 | (2006.01) |
| B32B 27/08 | (2006.01) |
| B32B 27/12 | (2006.01) |
| B32B 27/32 | (2006.01) |
| F16L 9/147 | (2006.01) |
| F16L 57/06 | (2006.01) |
| B32B 1/02 | (2006.01) |

(52) U.S. Cl.
CPC ............... B32B 27/308 (2013.01); B32B 1/08 (2013.01); B32B 15/08 (2013.01); B32B 27/08 (2013.01); B32B 27/12 (2013.01); B32B 27/32 (2013.01); F16L 9/147 (2013.01); F16L 57/06 (2013.01); B32B 2307/00 (2013.01); B32B 2307/536 (2013.01); B32B 2307/546 (2013.01); B32B 2307/554 (2013.01); B32B 2597/00 (2013.01)
USPC ....... 428/35.3; 428/34.1; 428/34.2; 428/35.7; 428/35.9; 428/36.9

(58) Field of Classification Search
USPC ............ 428/34.1, 34.2, 35.7, 35.9, 36.9, 35.3
See application file for complete search history.

(56) References Cited

U.S. PATENT DOCUMENTS

| | | | |
|---|---|---|---|
| 3,264,272 | A | 8/1966 | Rees |
| 3,404,134 | A | 10/1968 | Rees |
| 3,498,827 | A | 3/1970 | Kaback et al. |
| 3,645,992 | A | 2/1972 | Elston |
| 4,042,559 | A | 8/1977 | Abelson et al. |
| 4,076,698 | A | 2/1978 | Anderson et al. |
| 4,081,302 | A | 3/1978 | Drostholm |
| 4,254,165 | A | 3/1981 | Phelps et al. |
| 4,351,931 | A | 9/1982 | Armitage |
| 4,407,893 | A | 10/1983 | Malizio |
| 4,521,465 | A | 6/1985 | Schroeer et al. |
| 5,028,674 | A | 7/1991 | Hatch et al. |
| 5,091,260 | A | 2/1992 | Wong et al. |
| 5,141,068 | A * | 8/1992 | Mendicino .................. 180/68.3 |
| 5,210,138 | A * | 5/1993 | Yamamoto et al. ........... 525/183 |
| 5,562,989 | A | 10/1996 | Statz et al. |
| 5,629,062 | A | 5/1997 | Ejiri et al. |
| 5,931,198 | A | 8/1999 | Raji et al. |
| 6,500,888 | B2 | 12/2002 | Baumgartner et al. |
| 6,518,365 | B1 | 2/2003 | Powell et al. |
| 6,737,134 | B2 | 5/2004 | Friedrich et al. |
| 7,018,691 | B2 | 3/2006 | McNeil |
| 7,405,008 | B2 * | 7/2008 | Domine et al. ............... 428/516 |
| 8,497,326 | B2 * | 7/2013 | Nakata et al. ............... 525/330.6 |
| 2002/0013413 | A1* | 1/2002 | Bellinger et al. ............. 525/179 |
| 2003/0001307 | A1* | 1/2003 | Miller ...................... 264/171.12 |
| 2005/0187315 | A1 | 8/2005 | Dean |
| 2006/0063893 | A1* | 3/2006 | Rajagopalan ................. 525/418 |
| 2006/0124188 | A1 | 6/2006 | Catha et al. |
| 2006/0151042 | A1 | 7/2006 | Stringfellow et al. |
| 2009/0107553 | A1 | 4/2009 | Hayes et al. |
| 2009/0107572 | A1 | 4/2009 | Hayes et al. |
| 2010/0009086 | A1 | 1/2010 | Tran et al. |

FOREIGN PATENT DOCUMENTS

| | | |
|---|---|---|
| GB | 2028461 A | 3/1980 |
| JP | 2000179752 A | 6/2000 |
| WO | WO-2004050362 A1 * | 6/2004 |
| WO | 2004068016 A2 | 8/2004 |

OTHER PUBLICATIONS

U.S. Appl. No. 61/449,756, Inventor: Smillie, Filing Date: Mar. 7, 2011.

* cited by examiner

Primary Examiner — Marc Patterson

(57) ABSTRACT

Disclosed is a multilayer structure useful for preparing highly abrasion-resistant protective liners, including tubular articles such as multilayer tubes or pipes.

13 Claims, No Drawings

MULTILAYER PROTECTIVE LINER

CROSS-REFERENCE TO RELATED APPLICATION

This application claims the benefit of U.S. Provisional application No. 61/449,762, filed Mar. 7, 2011.

FIELD OF THE INVENTION

The invention relates to a multilayer protective liner comprising an ionomer wear layer.

BACKGROUND OF THE INVENTION

Mining operations require the transport of highly abrasive particulate or slurry streams. The recovery of bitumen from oil sands is becoming increasingly important in the energy industry. Processing oil sand includes transporting and conditioning the oil sand as aqueous slurry over kilometer lengths of pipe up to one meter or more in diameter. Often, metal pipes such as carbon steel or cast iron pipes are used for the transport of these highly abrasive streams of oil sand slurry. They are expensive, heavy and only provide a temporary solution since they are eventually destroyed. To increase their lifetimes, the metal pipes may be rotated 90 degrees on their axes on a regular schedule to provide new transport surfaces. However, because of the pipe weight, this rotation is difficult and ultimately the entire pipe is worn out and must be replaced.

Use of plastic pipes, pipe liners and pipe coatings has been proposed to reduce these shortcomings. U.S. Patent Application Publications 2009/0107572 and 2009/0107553 describe abrasion resistant ionomer lined steel pipes. References to other plastic pipe liners and methods for lining a pipe with a polymeric liner can be found in those publications.

In some cases, additional materials have been used to adhere polymeric pipe liners to metal pipes. Japanese Patent Application JP2000179752 discloses the use of epoxy primers to adhere ionomer tubes to water service metal pipes. The methods described therein involve either preheating the pipe prior to coating with epoxy or post-coating heating to cure the epoxy. Heating the pipe to cure the epoxy adds to the complexity and expense to prepare the steel pipe for bonding to the ionomer liner.

U.S. Patent Application Publication 2010/0009086 discloses a rapid-cure epoxy coating system for protecting the exterior of pipes.

Because of the extreme conditions that ionomer-lined pipes experience during hydroslurry operations, good adhesion of the liner to the metal pipe casing is important. It is also important that the liner have sufficient resistance to wear from the abrasive slurries to protect the pipe. Other useful properties include good chemical resistance, high temperature resistance, and low moisture transmittance. It may be difficult to attain all properties desirable for a pipe liner in a single material. Therefore, multilayer structures with layers comprising different materials may be advantageous for a pipe liner. For example, one surface layer of a multilayer structure may provide good adhesion to the metal substrate and a second surface layer may provide good abrasion resistance.

SUMMARY OF THE INVENTION

The invention provides a thermoplastic multilayer structure comprising at least three layers, useful as an abrasion resistant liner for a metal substrate used for hydro-slurry transport, wherein (a) a first surface layer acts as an abrasion resistant wear layer and comprises a soft thermoplastic composition with melting point in a range from about 60 to about 220° C., with flexural modulus determined at 21° C. according to ASTM D790 of less than or equal to 90 MPa and Shore D hardness (ASTM D2240, ISO 868) from about 30 to about 50;

(b) a second surface layer acts as an adhesive layer for bonding to a metal substrate or an epoxy treated metal substrate and comprises a thermoplastic polymer composition containing acid functionality, an ionomer thereof, or anhydride functionality with flexural modulus determined at 21° C. according to ASTM D790 of less than 100 MPa and melting point in a range from about 60 to about 100° C.; and (c) at least one interior layer of a material selected from the group consisting of thermoplastic resin, fiber reinforcement, and metal and combinations thereof that provides structure to the liner, wherein the thermoplastic resin comprises a composition with flexural modulus determined at 21° C. according to ASTM D790 of greater than 80 MPa, preferably greater than 200 MPa, melting point in a range from about 75 to about 150° C., and moisture vapor permeation value less than 2 g-mil/100 in$^2$-day.

Embodiments of the multilayer structure include those wherein the first surface layer (a) comprises an ionomer of an ethylene acid terpolymer comprising an E/X/Y copolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, preferably acrylic acid or methacrylic acid, and Y is present in from 3 to 45 weight % of the E/X/Y copolymer and represents copolymerized units of a softening comonomer selected from alkyl acrylate or alkyl methacrylate, wherein the alkyl groups have from 1 to 8 carbon atoms, or vinyl acetate, wherein at least a portion of the carboxylic acid groups in the copolymer are neutralized to salts containing alkali metal cations, alkaline earth metal cations, transition metal cations, or combinations of two or more of these metal cations.

In these embodiments, the multilayer structure comprises (b) a second surface layer comprising (1) a polyolefin graft copolymer comprising a trunk polymer comprising polyethylene, polypropylene, styrene-ethylene-butene-styrene triblock copolymer, polybutadiene or a copolymer comprising copolymerized units of ethylene and copolymerized units of vinyl acetate, alkyl acrylate or alkyl methacrylate; wherein the alkyl groups have from 1 to 8 carbon atoms, wherein the trunk polymer is modified by grafting thereto a cyclic anhydride of $C_4$-$C_8$ unsaturated acids; or (2) an ethylene dicarboxylic random copolymer comprising copolymerized units of ethylene and copolymerized units of a dicarboxylic comonomer selected from the group consisting of cyclic anhydrides of $C_4$-$C_8$ unsaturated acids, monoesters of $C_4$-$C_8$ unsaturated acids having at least two carboxylic acid groups, diesters of $C_4$-$C_8$ unsaturated acids having at least two carboxylic acid groups, and mixtures thereof, wherein the ethylene dicarboxylic copolymer comprises from about 0.3 to about 20 weight % copolymerized units of dicarboxylic comonomer, based on the weight of the random copolymer; or (3) an ethylene acid terpolymer comprising an E/X/Y copolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, preferably acrylic acid or methacrylic acid, and Y is present in from 3 to 45 weight % of the E/X/Y copolymer and represents copolymerized units of a softening comonomer selected from alkyl acrylate or alkyl methacrylate, wherein the alkyl groups have from 1 to 8 carbon atoms, or vinyl acetate; or an ionomer thereof wherein at least a portion of the carboxylic acid groups in the terpolymer are neutralized to salts containing alkali metal cations, alkaline earth metal cations, transition metal cations, or combinations of two or more of these metal cations; or (4) an ethylene acid E/Z dipolymer wherein E represents copolymerized units of ethylene, and Z is present in an amount of about 10 to about 25 weight % of the E/Z dipolymer and represents copolymerized units of a $C_{3-8}$ $\alpha,\beta$-ethylenically unsaturated carboxylic acid, preferably acrylic acid or methacrylic acid; and/or (c) an interior layer comprising (1) an ionomer of an E/W ethylene acid dipolymer wherein E represents copolymerized units of ethylene, W is present in an amount of about 2 to about 30 weight % of the E/X/Y polymer and represents copolymerized units of a $C_{3-8}$ $\alpha,\beta$-ethylenically unsaturated carboxylic acid, wherein at least a portion of the carboxylic acid groups in the dipolymer are neutralized to salts containing alkali metal cations, alkaline earth metal cations, transition metal cations, or combinations of two or more of these metal cations; or (2) a polyethylene homopolymer, polyethylene copolymer, polypropylene homopolymer or polypropylene copolymer.

DETAILED DESCRIPTION OF THE INVENTION

All publications, patent applications, patents, and other references mentioned herein are incorporated by reference in their entirety.

Although methods and materials similar or equivalent to those described herein can be used in the practice or testing of the present invention, suitable methods and materials are described herein.

Unless stated otherwise, all percentages, parts, ratios, etc., are by weight. When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When the term "about" is used in describing a value or an end-point of a range, the disclosure includes the specific value or end-point referred to.

As used herein, the terms "comprises," "comprising," "includes," "including," "containing," "characterized by," "has," "having" or any other variation thereof, are intended to cover a non-exclusive inclusion. The transitional phrase "consisting of" excludes any element, step, or ingredient not specified in the claim, closing the claim to the inclusion of materials other than those recited except for impurities ordinarily associated therewith. The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format.

Where applicants have defined an invention or a portion thereof with an open-ended term such as "comprising," the description is interpreted to also describe such an invention using the terms "consisting essentially of" or "consisting of."

Use of "a" or "an" are employed to describe elements and components of the invention. This is done merely for convenience and to give a general sense of the invention. This description includes one or at least one and the singular also includes the plural unless it is obvious that it is meant otherwise.

In describing certain polymers it is to be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts is to be interpreted to mean that the polymer is made from those monomers or that amount of the monomers, and the corresponding polymers and compositions thereof.

The materials, methods, and examples herein are illustrative only and, except as specifically stated, are not intended to be limiting.

As used herein, a "multilayer structure" comprises layers of materials wherein all layers in that structure are bonded or adhered to the layers they are in contact with. A multilayer ionomer structure, such as a film, sheet or tube, has at least one surface layer that comprises an ionomer composition. As used herein, when a multilayer structure is in tubular form, the "outermost" layer is the surface layer facing the outside of the tube, and the "innermost" layer is a surface layer facing the inside of the tube. "Interior" layers are not surface layers. As used herein for multilayer structures, "adhesive" and "adhesive layer" refer to compositions and layers that are in contact with the metal substrate or to an epoxy composition used to adhere the multilayer structure to the metal. The term "wear layer" refers to the layer that is farthest from the metal substrate and functions as an abrasion resistant surface protecting the metal from abrasion. The term "tie layer" refers to a layer that facilitates adherence between two other layers in a multilayer structure.

As used herein, "ambient temperature" means that no heating or cooling is applied to the coated substrate beyond what is prevailing in the environment around the coated substrate. The temperature may be from about 0° C. to about 40° C., preferably from about 20° C. to about 30° C.

For low wear protective coatings, thermoset epoxy or urethane coatings have been applied at less than 500 µm thickness. The two part epoxies can be painted onto a steel surface by spray, roll or dip coatings (Corlar® from DuPont). Two part epoxy coatings are also available as fine powders (Napgard® from DuPont) that can be applied by fusion bonding (dip coating of the hot part in a fluidized bed or electrostatic spray of the powder onto the steel). DuPont also has a line of thermoplastic polymer powder coatings under the Abcite® brand include zinc ionomers and acid copolymer resins that can be applied by fusion bonding.

Some applications need better wear and or corrosion resistance than can be provided by fused powder or paint coatings of the pipe surface. Such thin coatings do not provide sufficient abrasion resistance in applications where metal surfaces are exposed to highly abrasive materials for extended periods of time.

The compositions and multilayer structures described herein can be used to provide metal protected against abrasion by long lifetime, highly abrasion-resistant ionomer liners. Applications include ionomer-lined pipes for a wide variety of mining and other transportation uses over a wide range of environmental conditions. High burst strength may be another attribute of the ionomer lined pipes.

We have found that "soft" thermoplastic materials with Shore D hardness in the 30 to 50 range are preferred materials for resistance to the abrasive action of sand water slurries. Our preferred method to bond the liner to the prepared metal substrate involves heating the liner to metal interface to thermally activate the bond between liner and metal substrate. Preferred adhesives include low melting ethylene di- or terpolymers containing acrylic acid or methacrylic acid functionality, ionomers thereof, or polymers with anhydride functionality. Low melting temperature is preferred because less heat is required to activate the bond between adhesive and metal substrate. Minimizing the heat required to activate the bond will minimize energy consumption and reduce the bonding cycle time. The multilayer structure will resist abrasion and remain well adhered to the metal substrate with surface layers having these characteristics.

For hydro-slurry applications where water is the means of fluidizing the particulate, chemical resistance, measured by a test like the Standard Test Method for Environmental Stress-Cracking of Ethylene Plastics ASTM test procedure D1693, to water is of particular importance. Chemical resistance to other components, for example salt solutions (sodium chloride, potassium or calcium chloride) or hydrocarbons (gasoline) of the slurry can be determined by ASTM D1693. For ionomers, chemical resistance is summarized at http://www2.dupont.com/Surlyn/en_US/assets/downloads/surlyn_chemical_resistance.pdf.

An alternative method to identify chemical resistance is to immerse the selected polymer in the solvent or solution of interest and measure the weight gain. Significant weight gain after a period of exposure indicate the solution is soluble in the polymer which could lead to undesirable effects like swelling of the polymer, plasticization (softening) of the polymer and potential extraction of the low molecular portion of the polymer by the solution. ASTM procedure D570 outlines protocols that can be used to assess the water absorption of a polymer. This test can be modified to consider other solvents besides water, such as hydrocarbons including naphtha.

A good barrier to water permeation may be useful to protect the metal pipe from corrosion and prevent delamination of the liner from the pipe caused by water infiltration. Low water permeability may be most important in the first surface layer and/or interior layers.

The terms "thermoplastic ionomer polymer" and "ionomer", and similar terms used herein, refer to a thermoplastic ionomer made from a parent acid copolymer comprising, consisting essentially of, or prepared from copolymerized units of an $\alpha$-olefin, preferably ethylene, copolymerized units of an $\alpha,\beta$-ethylenically unsaturated carboxylic acid, and optionally copolymerized units of a softening comonomer. "Softening" means that the polymer is made less crystalline. Ionomers comprise such acid copolymers wherein at least a portion of the carboxylic acids are neutralized to provide salts with a metal ion.

The acid copolymers used to make the ionomer compositions described herein are preferably random acid copolymers. In random copolymers, at least some of the atoms comprising the copolymerized monomers are part of the polymer backbone or chain.

Acid copolymers may be described as E/X/Y copolymers where E represents copolymerized units of ethylene, X represents copolymerized units of a $C_{3-8}$ $\alpha,\beta$-ethylenically unsaturated carboxylic acid, preferably acrylic acid or methacrylic acid, and Y represents copolymerized units of a softening comonomer selected from alkyl acrylate or alkyl methacrylate, wherein the alkyl groups have from 1 to 8 carbon atoms, or vinyl acetate. X is present in an amount of about 2 to about 30 (or about 2 to 25 or about 2 to 20, or about 5 to 25) weight % of the E/X/Y polymer, and Y is present in from 0 to 45 weight % of the E/X/Y copolymer.

Preferably E/X/Y terpolymers are used as the precursor polymers for ionomers used in the wear and/or adhesive layers of the multilayer structure. Included are E/X/Y terpolymers in which X represents copolymerized units of methacrylic acid and Y represents copolymerized units of an alkyl methacrylate or preferably an alkyl acrylate and is present in an amount from 3 to 45 weight % of the E/X/Y terpolymer (such as from a lower limit of 3 or 5 or preferably 10, to an upper limit of 25, 30 or 45). These terpolymers include without limitation ethylene/methacrylic acid/methyl acrylate, ethylene/methacrylic acid/ethyl acrylate, and ethylene/methacrylic acid/iso-butyl acrylate terpolymers, and preferably ethylene/methacrylic acid/n-butyl acrylate terpolymers.

Similarly, terpolymers may include copolymerized units of acrylic acid in about 2 to about 30 (or about 2 to 25 or about 2 to 20, or about 5 to 25) weight % of the E/X/Y polymer, and copolymerized units of alkyl methacrylate or alkyl acrylate in an amount from 3 to 45 (such as from a lower limit of 3 or 5 or preferably 10, to an upper limit of 25, 30 or 45) weight % of the E/X/Y terpolymer.

Of note are E/X/Y terpolymers, wherein X (e.g. acrylic acid or preferably methacrylic acid) is present in an amount from 5 to 20 weight % of the copolymer and Y (e.g. alkyl acrylate such as butyl acrylate) is present in an amount from 10 to 30 weight % of the copolymer.

A specific example is an E/X/Y terpolymer comprising 10 weight % methacrylic acid and 10 weight % n-butyl acrylate based on the total weight of the parent acid terpolymer, the remainder ethylene, with MI of about 10 g/10 min. This terpolymer may be useful in the adhesive layer in nonionized form.

Another specific example is an E/X/Y terpolymer comprising containing 9 weight % methacrylic acid and 23.5 weight % n-butyl acrylate based on the total weight of the parent acid terpolymer, the remainder ethylene. An ionomer prepared from this terpolymer may be useful in the adhesive layer and/or the abrasion resistant layer.

Also of note are dipolymers, copolymers consisting essentially of copolymerized units of ethylene and copolymerized units of $C_{3-8}$ $\alpha,\beta$-ethylenically unsaturated carboxylic acid, preferably acrylic acid or methacrylic acid, and 0% of Y. E/W dipolymers wherein W is present in an amount of 5 to 25 weight % of the dipolymer, including without limitation ethylene/acrylic acid dipolymers or ethylene/methacrylic acid dipolymers, are preferably used for ionomers in an interior core layer of the multilayer structure. Other dipolymers of note are E/Z dipolymers wherein Z is present in an amount of 10 to 25 weight % of the dipolymer, including without limitation ethylene/acrylic acid dipolymers or ethylene/methacrylic acid dipolymers, are preferably used in the adhesive layer in nonionized form.

The parent acid copolymers may be polymerized as disclosed in U.S. Pat. Nos. 3,404,134; 5,028,674; 6,500,888; and 6,518,365.

They may be neutralized as disclosed in U.S. Pat. Nos. 3,264,272 and 3,404,134 to salts comprising metal ions. The ionomers may be neutralized to any level that does not result in an intractable (not melt processible) polymer without useful physical properties. The ionomers are neutralized so that from about 5 to about 90%, or preferably from about 15 to about 90%, more preferably about 40 to about 75% of the acid moieties of the acid copolymer are neutralized to form carboxylate groups, based on the total carboxylic acid content of the parent acid copolymers as calculated for the non-neutralized parent acid copolymers.

Preferred counterions for the carboxylate groups include alkali metal cations, alkaline earth metal cations, transition metal cations, and combinations of two or more of these metal cations. The metal ions may be monovalent, divalent, trivalent, multivalent, or mixtures thereof. When the metallic ion is multivalent, complexing agents such as stearate, oleate, salicylate, and phenolate radicals may be included, as disclosed in U.S. Pat. No. 3,404,134. The metallic ions are preferably monovalent or divalent metallic ions.

Preferably, cations useful in the ionomers include lithium, sodium, potassium, magnesium, calcium, or zinc, or combinations of two or more of these cations. More preferably, the metallic ions are selected from the group consisting of sodium, lithium, magnesium, zinc and mixtures thereof, yet more preferably, sodium, zinc and mixtures thereof. Most preferably, the metallic ions are zinc.

Embodiments of the multilayer abrasion resistant structure include a first soft surface layer (the innermost layer of a tubular pipe liner) comprising an ionomer of an E/X/Y terpolymer described above and a second surface layer (the outermost layer of a tubular pipe liner) also comprising a low melting ionomer of an E/X/Y terpolymer described above. In these embodiments the ionomer in the first surface layer may be the same as, or different from, the ionomer used in the second surface layer.

The soft ionomer in the abrasion resistant wear layer of the liner (innermost layer of the pipe liner) has a Shore D hardness (ASTM D2240, ISO 868) from about 30 to about 50, notably about 30 to about 45. The composition may have Shore A value of less than 90. The ionomer of this layer may have a flexural modulus determined at 21° C. according to ASTM D790 of less than or equal to 90 MPa, such as in a range from 25 to 80 MPa, preferably from 25 to 60 MPa. The ionomer composition used in the wear layer in the multilayer liner structure has a melting point of about 60 to about 220° C., such as 60 to about 80° C., notably from about 65 to about 75° C.

An ionomer composition used as the adhesive layer in the multilayer liner structure has a melting point of about 60 to about 220° C., preferably about 60 to about 80° C., preferably from about 65 to about 75° C. Preferably, it also has flexural modulus determined at 21° C. according to ASTM D790 of less than or equal to 90 MPa and Shore D hardness (ASTM D2240, ISO 868) from about 30 to about 50.

A notable ionomer used in the wear layer consists essentially of an E/X/Y terpolymer containing 23.5 weight % of n-butyl acrylate and 9 weight % of methacrylic acid based on the total weight of the parent acid terpolymer, the remainder ethylene, wherein at least a portion of the carboxylic acid groups are neutralized to salts of zinc ions. This ionomer is also useful as an adhesive layer for bonding to epoxy-coated metal substrates.

For an E/W ionomer used in an interior layer of the multilayer liner structure, the composition has a flexural modulus determined at 21° C. according to ASTM D790 of greater than 80 MPa, preferably greater than 200 MPA. Preferably the ionomer has a melting point in a range from about 75 to about 150° C., preferably about 80° C. to 120° C. or higher, most preferably about 85° C. or higher. The ionomer layer provides the high thermal resistance to the pipe required by many demanding uses. To serve as a moisture barrier, the composition has a moisture vapor permeation value less than 2 g-mil/100 in$^2$-day, preferably below 1.5 g-mil/100 in$^2$-day, or lower.

A notable ionomer used in an interior layer consists essentially of an E/W dipolymer containing 15 weight % methacrylic acid based on the total weight of the parent acid dipolymer, the remainder ethylene, wherein at least a portion of the carboxylic acid groups are neutralized to salts of zinc ions.

Suitable ionomers are available commercially from E.I. du Pont de Nemours, Wilmington, Del. (DuPont) under the Surlyn® tradename.

The ionomer compositions may include additives known in the art. The additives include plasticizers, processing aids, flow enhancing additives, flow reducing additives, lubricants, flame retardants, impact modifiers, nucleating agents to increase crystallinity, antiblocking agents such as silica, thermal stabilizers, UV absorbers, UV stabilizers, dispersants, surfactants, chelating agents, coupling agents, adhesives, primers and the like. One of ordinary skill in the art will recognize that additives may be added to the ionomer composition using techniques known in the art or variants thereof, and will know the proper amounts for addition based upon typical usage. The total amount of additives used in the composition may be up to about 5, 10 or 15 weight % based upon the weight of the ionomer composition.

When used in an interior layer of a multilayer liner structure, a dipolymer ionomer composition may further comprise about 0.1 to about 80 weight % filler based on the total weight of the filled composition.

Preferably, the filler is abrasion-resistant filler. The filler may be reinforcing filler or non-reinforcing filler. Specific examples of preferred reinforcing fillers include high strength fibers such as fiberglass, continuous glass fiber, polyaramide fiber, Kevlar® (aramid fiber, a product of DuPont, one or more fibers made from one or more aromatic polyamides, wherein at least 85% of the amide (—CONH—) linkages are attached directly to two aromatic rings), graphite, carbon fiber, silica, quartz, ceramic, silicon carbide, boron, alumina, alumina-silica, polyethylene, ultrahigh molecular weight polyethylene, polyimide, liquid crystal polymers, polypropylene, polyester, polyamide and the like. For example, US2006/0124188 and US2006/0151042 disclose fiber-reinforced pipe liners. Specific examples of non-reinforcing fillers include particles of abrasion-resistant minerals, marble, slate, granite, sand, potters' sand, silicates, limestone, clay, glass, quartz, metallic powders, aluminum powders, stainless steel powders, zinc metal, refractory metal borides (such as borides of aluminum, niobium, silicon, tantalum, titanium, tungsten, and zirconium), carbides (such as carbides of boron, niobium, silicon, tantalum, titanium, tungsten and zirconium), nitrides (such as nitrides of aluminum, boron, niobium, silicon, tantalum, titanium, tungsten and zirconium), oxides (such as oxides of aluminum, niobium, silicon, tantalum, titanium, tungsten and zirconium), silicon carbide, alumina, fused combinations of alumina and zirconia, calcium carbonate, barium sulfate, magnesium silicate and the like and combinations thereof.

The size of the filler incorporated in the ionomer composition depends on the thickness and diameter of the ionomer pipe and is smaller than the thickness of the ionomer pipe. Preferably, a mixture of particle sizes is used to provide a higher density (percentage by volume) of filler incorporated. For abrasion-resistant fillers, this will result in higher abrasion resistance of the filled pipe. Pipes comprising filled polymeric compositions are known (U.S. Pat. Nos. 3,498,827, 4,042,559, 4,254,165, 4,407,893, 5,091,260, 5,562,989, and GB2028461).

Alternative compositions useful in the adhesive layer include graft copolymers comprising a trunk polymer comprising polyethylene, polypropylene, styrene-ethylene-butene-styrene triblock copolymer, polybutadiene, ethylene propylene diene or a copolymer comprising copolymerized units of ethylene and copolymerized units of vinyl acetate, alkyl acrylate or alkyl methacrylate; wherein the alkyl groups have from 1 to 8 carbon atoms, wherein the trunk polymer is modified by grafting thereto a cyclic anhydride of $C_4$-$C_8$ unsaturated acids.

Graft copolymers are synthesized by appending or "grafting" a moiety as a pendant group on an already-formed polymer chain. The grafted comonomer is attached to non-terminal repeat units of an existing polymer chain in a step subsequent to formation of the polymer chain, often by a free radical reaction. In a graft copolymer, none of the atoms of the grafted group are incorporated into the backbone of the polymer chain. The term "trunk polymer" as employed herein includes polyolefins such as polyethylene, ethylene propylene copolymers, and polypropylene or the polymerization product of ethylene and at least one additional polymerizable monomer such as vinyl acetate, alkyl acrylate, alkyl methacrylate, etc. that are polymerized or copolymerized and subsequently grafted with an additional comonomer to provide a graft copolymer.

A preferred anhydride is maleic anhydride. These maleic anhydride-grafted polymers (maleated polymers) are polymeric materials in which maleic anhydride is reacted with an existing polymer, often under free-radical conditions, to form anhydride groups appended to the polymer chain. They include maleated polyethylene, maleated polypropylene, maleated ethylene vinyl acetate copolymers, maleated ethylene methyl acrylate copolymers, maleated metallocene polyethylene, maleated ethylene propylene copolymers, maleated styrene-ethylene-butene-styrene triblock copolymer, and maleated polybutadiene and maleated ethylene propylene diene copolymers.

The trunk polymers may be synthesized and subsequently grafted with maleic anhydride according to well-known procedures. Such graft copolymers are also commercially available from DuPont under the tradename Fusabond®.

A notable maleated copolymer useful as an adhesive surface layer in the multilayer structure is a maleic anhydride modified metallocene ethylene-octene graft copolymer.

Other alternative compositions useful as adhesive layer include ethylene dicarboxylic random copolymer comprising copolymerized units of ethylene and copolymerized units of a dicarboxylic comonomer selected from the group consisting of cyclic anhydrides of $C_4$-$C_8$ unsaturated acids, monoesters of $C_4$-$C_8$ unsaturated acids having at least two carboxylic acid groups, diesters of $C_4$-$C_8$ unsaturated acids having at least two carboxylic acid groups, and mixtures thereof, wherein said second ethylene copolymer comprises from about 5 to about 15 weight % copolymerized units of said polar comonomer, based on the weight of the random copolymer.

Examples of suitable dicarboxylate comonomers include unsaturated anhydrides such as maleic anhydride and itaconic anhydride; $C_1$-$C_{20}$ alkyl monoesters of 1,4-butenedioc acids (e.g. maleic acid, fumaric acid, itaconic acid and citraconic acid), including methyl hydrogen maleate, ethyl hydrogen maleate, propyl hydrogen fumarate, and 2-ethylhexyl hydrogen fumarate; and diesters of 1,4-butenedioc acids, including dimethyl maleate, diethyl maleate and dipropyl fumarate. Of these, maleic anhydride, ethyl hydrogen maleate and methyl hydrogen maleate are preferred. Maleic anhydride and ethyl hydrogen maleate are most preferred.

The ethylene dicarboxylate random copolymer may comprise about 0.3 to about 20 weight % copolymerized units of the dicarboxylate comonomer, based on the weight of the ethylene dicarboxylate random copolymer. Alternatively, the level of copolymerized units of the dicarboxylate comonomer is in the range of about 4 to about 20 weight %, or about 4 to about 15 weight %, or about 6 to about 15 weight %, or about 8 to about 12.5 weight %, based on the total weight of the copolymer.

The ethylene dicarboxylate random copolymer may be a dipolymer or a higher order copolymer, such as a terpolymer or tetrapolymer. Specific examples include ethylene/maleic acid monoester dipolymers (such as ethylene/ethyl hydrogen maleate dipolymer), ethylene/maleic acid monoester/methyl acrylate terpolymers, ethylene/maleic acid monoester/methyl methacrylate terpolymers, ethylene/maleic acid monoester/ethyl acrylate terpolymers, ethylene/maleic acid monoester/ethyl methacrylate terpolymers, ethylene/maleic acid monoester/n-butyl acrylate terpolymers and ethylene/maleic acid monoester/n-butyl methacrylate terpolymers.

A representative ethylene dicarboxylate random copolymer is a random copolymer having a melt index of about 0.3 to 100 grams/10 minutes measured using ASTM D-1238 at 190° C., using a 2160 gram weight, and consisting essentially of copolymerized ethylene and a monoalkyl ester of a 1,4-butenedioic acid in which the alkyl group of the ester has 1 to 6 carbon atoms. Preferably, the copolymer is a dipolymer of ethylene and about 4 to about 15 weight % of ethyl hydrogen maleate (an E/MAME copolymer). A specific polymer may comprise from about 8 to about 10 weight % of ethyl hydrogen maleate. Such copolymers are commercially available from DuPont under the tradename Fusabond®.

Terpolymers or tetrapolymers comprise comonomers in addition to the ethylene and dicarboxylate comonomer. Suitable additional comonomers may be selected from the group consisting of vinyl acetate, alkyl acrylates, such as methyl acrylate and butyl acrylate, and alkyl methacrylates, for example methyl methacrylate and n-butyl methacrylate. Preferably, when the ethylene dicarboxylate random copolymer is a higher order polymer such as a terpolymer, the combined comonomers other than ethylene are present in about 6 to about 30 weight % of the copolymer.

Ethylene/maleic anhydride/alkyl ester terpolymers are commercially available from Arkema under the tradename Lotader®, with maleic anhydride amounts of 0.3 to about 4 weight % and acrylic ester content of about 5 to 30 weight %, based on the total weight of the copolymer.

Ethylene/ethyl hydrogen maleate/alkyl ester terpolymers are also known, including terpolymers with ethyl hydrogen maleate content of 0.5 to about 10 weight % and acrylic ester content of about 5 to 30 weight %, based on the total weight of the copolymer.

The ethylene dicarboxylate random copolymers may be synthesized as described in U.S. Pat. No. 4,351,931. Some examples of this type of ethylene/ester copolymer are described in U.S. Patent Application Publication 2005/0187315.

The interior layer of the multilayer structure may alternatively comprise polyethylene homopolymers, polyethylene copolymers, polypropylene homopolymers or polypropylene copolymers.

Polyethylene homopolymers or polyethylene copolymers comprise units derived from ethylene as the major portion or percentage by weight of the copolymer. By major portion or percentage is meant about 70 weight %, about 80 weight % or more of the copolymer. Examples of polyethylene copolymers are copolymers of ethylene and alpha-olefins, including copolymers with propylene and other alpha-olefins, wherein copolymerized units of ethylene comprise the major portion of the copolymer.

Suitable polyethylene homopolymers and polyethylene copolymers include linear polyethylenes such as high density polyethylene (HDPE), linear low density polyethylene (LLDPE), very low or ultralow density polyethylenes (VLDPE or ULDPE), branched polyethylenes such as low density polyethylene (LDPE), and copolymers of ethylene and alpha-olefin monomers prepared in the presence of metallocene catalysts, single site catalysts or constrained geometry catalysts (herein referred to as metallocene polyethylenes, or MPE). The densities of PE suitable for use in the composition range from about 0.865 g/cc to about 0.970 g/cc.

Polyethylene homopolymers and copolymers may be prepared by a variety of methods. Examples of such processes include, but are not limited to, the well-known Ziegler-Natta catalyst polymerization process (see for example U.S. Pat. Nos. 4,076,698 and 3,645,992), metallocene catalyzed polymerization, VERSIPOL® single-site catalyst polymerization and free radical polymerization. The term metallocene catalyzed polymerization includes polymerization processes that involve the use of metallocene catalysts as well as those processes that involve use of constrained geometry and single-site catalysts. Polymerization may be conducted as a solution-phase process, a gas phase-process and the like. Polyethylenes used in the compositions described herein may be obtained from recycled material.

Examples of linear polyethylenes include ethylene copolymers having copolymerized units of alpha-olefin comonomers such as butene, hexene or octene. Suitable alpha-olefins may be selected from the group consisting of alpha-olefins having at least three carbon atoms, preferably from 3 to 20 carbon atoms. These comonomers may be present as copolymerized units in an amount up to about 20 weight % or 30 weight % of the copolymer. Preferred alpha-olefins include propylene, 1-butene, 1-hexene, 4-methyl-1-pentene, 1-octene, 1-decene, 1-tetradecene and 1-octadecene. Copolymers may be obtained by polymerization of ethylene with two or more alpha-olefins, preferably including propylene, 1-butene, 1-octene and 4-methyl-1-pentene.

Also contemplated for use as the polyethylene component are blends of two or more of these ethylene alpha-olefin copolymers as well as mixtures of an ethylene homopolymer and one of the suitable ethylene alpha-olefin copolymers.

Polypropylene polymers suitable for use as the polyolefin component of the polymer compositions of the invention include homopolymers, random copolymers, block copolymers and higher order copolymers, such as terpolymers of propylene. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymers of propylene and ethylene. Copolymers of propylene include copolymers of propylene with other olefins such as 1-butene, 2-butene and the various pentene isomers, etc. and preferably copolymers of propylene with ethylene, wherein units derived from propylene comprise the major portion or percentage by weight of the copolymer.

Polypropylene homopolymers or random copolymers can be manufactured by any known process. For example, polypropylene polymers can be prepared in the presence of Ziegler-Natta catalyst systems, based on organometallic compounds and on solids containing titanium trichloride.

Block copolymers can be manufactured similarly, except that propylene is generally initially polymerized by itself in a first stage and propylene and additional comonomers such as ethylene are then polymerized, in a second stage, in the presence of the polymer obtained during the first stage. Each of these stages can be carried out, for example, in suspension in a hydrocarbon diluent, in suspension in liquid propylene, or in gaseous phase, continuously or discontinuously, in the same reactor or in separate reactors.

When used herein, "polypropylene" refers to any of the polypropylene homopolymers and propylene copolymers described above.

The compositions described above can be formed or incorporated into generally planar multilayer films and sheets, or multilayer tubular films and pipes by methods known in the art. In general, sheets and pipes are thicker and stiffer than films and tubular films, respectively. The multilayer structures can be used as abrasion resistant liners or protective coverings.

Example multilayer structures may have three or more layers, in which each of the surface layers comprise a low melting soft ionomer, and at least one interior layer which may or may not comprise an ionomer. In such multilayer structures, the surface layers may comprise the same ionomer composition or different ionomer compositions. Additionally, the surface layers may have different thicknesses, depending on their function. For example, one surface layer may be thicker and serve as an abrasion-resistant layer and the other surface layer may be thinner and serve as an adhesion layer to bond with the epoxy-coated substrate.

A multilayer liner of note comprises a first soft surface layer of an ionomer composition that is an abrasion resistant layer, a second surface layer of a low melting adhesive composition that may be adhered to metal or epoxy-primed metal, and at least one interior layer of a material selected from the group consisting of thermoplastic resin (including an additional ionomer layer different from the abrasion resistant layer and/or the adhesive layer), fiber reinforcement, and metal and combinations thereof. The interior layer may provide bulk to the structure and/or may modify the properties of the structure, such as providing enhanced moisture barrier.

A notable multilayer structure comprises a first surface layer comprising an ionomer of an ethylene acid terpolymer, an interior layer comprising an ionomer of an ethylene acid dipolymer, and a second surface layer comprising an ionomer of an ethylene acid terpolymer. A multilayer structure with ionomers in all categorical layers (abrasion, adhesive and interior) does not require additional tie layers between the abrasion and interior or adhesive and interior, because the different ionomers adhere well to each other. For the same reason, a multilayer structure based on a soft ionomer abrasion resistant layer, a low melting ethylene acid copolymer or terpolymer adhesive layer and an ionomer interior layer will not require tie layers.

The liner may be a complex multilayer structure of, in order, a first layer comprising a terpolymer ionomer as a wear layer ionomer, a first tie layer, an interior layer of high density polyethylene (HDPE) or polypropylene (PP), a second tie layer and a second layer of terpolymer ionomer capable of bonding to the epoxy-primed steel. The tie layers bond the high density polyethylene (HDPE) or polypropylene (PP) to the ionomer layers. By adding a layer of HDPE or PP to the structure water permeation can be reduced in a much thinner liner structure. Materials suitable for tie layers include maleated graft copolymers and ethylene dicarboxylate random copolymers as described above.

A multilayer ionomer film or sheet may be produced by any method known in the art. Preferably the film or sheet is produced through melt processes, such as extrusion or coextrusion blown film processes, extrusion or coextrusion film or sheet melt casting processes, sheet profile extrusion or coextrusion processes, lamination processes, extrusion coating processes, calendar processes and the like. The films and sheets may undergo secondary formation processes, such as the plying together of preformed sheets to produce thicker sheets through thermal lamination.

Tubular films may be prepared by blown film extrusion or coextrusion. Alternatively, planar films and sheets may be formed into tubular articles by rolling widthwise to bring opposed ends of the sheet into contact, and bonding the edges together by processes including extrusion welding. The ends can be joined using either overlapping joints or butt joints.

Cast or blown films are typically up to 500 μm thick. Thicker structures may be described as sheets or tubes. Some protective applications may require protective layers 2000 to 3000 μm thick. If the ionomer wear layer is less than 0.04 inches thick (1 mm) the hardness of the supporting steel backing reduces the ability of the ionomer to behave elastically to the abrasive slurry and consequently the wear resistance of the ionomer deteriorates. Sheets may be from 3 to 60 mm thick. Thicker sheets provide more material for wear and reduce the permeation rate of water and chemicals through the liner so that interference with the bond between liner and prepared steel is minimized. In some cases, thick sheets or tubes may be built up by overlaying and adhering two or more thinner films.

As used herein, "overlaying" comprises placing layers of materials so that at least one layer is in contact with at least one other layer but is not bonded or adhesively attached to that other layer. Additional layers may be bonded or adhesively attached to the layers that are in contact but not bonded or adhesively attached.

A multilayer liner in the form of a tube comprises an innermost layer having a thickness of about 6.3 to about 51 mm (about 0.25 to about 2 inches) comprising a terpolymer ionomer composition described above. The tube may have a hollow circular profile and the wall thickness may be uniform around the circumference of the tube, or the tube may have any profile and the wall thickness may vary around the circumference of the tube as desired, provided it is at least about 6.3 mm. The ionomer composition is positioned as the innermost layer to provide desirably superior abrasion-resistance. The ionomer tube thickness provides not only a long lifetime under extreme abrasive use conditions, but also provides chemical resistance to protect the steel pipe from both abrasion and corrosion.

For hydro-slurry transport of oil sands the liner is desirably from 0.7 to 1.5 inches thick (18 to 40 mm). The adhesive layer may be at least 0.05 inch (1.25 mm) thick or more. To provide adequate structure to the multilayer liner, the interior layer is desirably 50 to 70% of the overall thickness of the liner and the wear layer would be the balance, about 0.25 inches to about 0.75 inches (6.3 mm to 20 mm).

For transport of hydroslurries other than oil sands, where some wear resistance is required, the minimum liner thickness may be about 0.01 inch (2.5 mm). The liner may comprise about 1.25 mm of adhesive layer with the balance divided between interior layer and wear layer.

The multilayer ionomer tube may have any dimensions (including outside diameter, inside diameter and length) required to meet the end use needs. For example but not limitation the ionomer tube preferably has an outer diameter (OD) of about 2.54 to about 254 cm (about 1 to about 100 inches), more preferably about 25.4 to about 152 cm (about 10 to about 60 inches) and most preferably about 51 to about 102 cm (about 20 to about 40 inches). For example but not limitation the ionomer tube preferably has a length of about 1.5 to about 12.2 m (about 5 to about 40 feet), more preferably about 3.1 to about 9.1 m (about 10 to about 30 feet) and most preferably about 10 to about 30 m (about 30 to 100 feet) to provide a convenient length for storage, transport, handling and installation. Longer lined sections are preferred to minimize the number of joints that need to be made in the field.

The ionomer tubular liner may be produced by any suitable process. For example, the ionomer tube may be formed by melt coextrusion, slush molding, rotomolding, rotational molding or any other procedures known in the art. More detailed descriptions of such processes can be found in U.S. Patent Application Publication 2009/0107572.

The ionomer liner may be in the form of a multilayer tube comprising an outermost layer comprising an ionomer composition, an innermost layer comprising an ionomer composition, and an interior layer that comprises a thermoplastic material, including an ionomer with different composition than the surface ionomer compositions.

The liner may be in the form of a multilayer tube comprising an outermost layer comprising an ionomer composition, an innermost layer comprising an ionomer composition; and an additional layer comprising fiber reinforcement.

The liner may be in the form of a multilayer tube comprising an innermost layer comprising an ionomer composition, an interior layer comprising a polymeric material; and another interior layer comprising fiber reinforcement.

The fiber reinforcement may be a filament, warp yarn, tape, unidirectional sheet, mat, cloth, knitted cloth, paper, nonwoven fabric or woven fabric, or mixtures thereof. The fiber preferably comprises a high strength fiber such as fiberglass, continuous glass fiber, polyaramide fiber, aramid fiber, graphite, carbon fiber, silica, quartz, ceramic, silicon carbide, boron, alumina, alumina-silica, polyethylene, ultrahigh molecular weight polyethylene, polyimide, liquid crystal polymers, polypropylene, polyester, polyamide and the like, and is preferably about 3 to about 30 microns thick.

The fiber may be impregnated with a resin ("prepreg"), such as thermoplastic or preferably thermoset resins. Suitable resins for impregnating the fiber layers include polyester, aromatic, aliphatic, cycloaliphatic or anhydride epoxy resins, vinylester, vinyl, acrylic, modified acrylic, urethane, phenolic, polyimide, bismaleimide, polyurea, siloxane-modified resins and the like and combinations thereof.

Fiber-reinforcement of thermoplastic tubes is known (U.S. Pat. Nos. 4,081,302; 4,521,465; 5,629,062; 5,931,198; 6,737,134; 7,018,691; US2006/0151042; and WO2004/068016).

The fiber reinforcement may be applied to the ionomer tube and multilayer ionomer tube by any known method. For example, the fiber reinforcement may be applied using known filament winding processes through winding the fiber reinforcement onto the ionomer tube and multilayer ionomer tube or by wrapping the fiber reinforcement around the ionomer tube and multilayer ionomer tube. Additional layers, including an outermost layer of ionomer can be applied over the reinforcement.

Copending application U.S. Ser. No. 61/449,756 describes in greater detail metal substrates that can be lined with the abrasion resistant liner.

Also as described in greater detail in copending application U.S. Ser. No. 61/449,756, it may be desirable to use an epoxy coating on the surface of the metal to be protected by the abrasion resistant liner. To minimize the cost of epoxy coating the steel pipe it is desirable to use an epoxy that can be applied to the prepared steel pipe (sandblasted to white metal) at ambient temperature and requires no preheating or post heating of the steel to achieve a hard durable surface finish. Since the ionomer liner is to be applied to the inside of steel pipes, it is important to develop a strong bond at the lowest possible interface temperature between epoxy and ionomer to prevent drooping or flow of the liner due to the pull of gravity. The epoxy primer desirably provides a strong thermally activated bond to the ionomer liner at an interface temperature between epoxy and ionomer that is higher than the melting point of the ionomer liner composition (about 90° C.), but less than a temperature at which the melt viscosity of the liner compositions are so low that it would start to flow.

A notable epoxy composition is SP-2888RG, an epoxy/urethane two part epoxy primer sold by Specialty Polymer Coatings, #101 20529 62nd Avenue, Langley BC V3A 8R4.

A notable base resin is EPON 828, an undiluted clear difunctional bisphenol A/epichlorohydrin derived liquid epoxy resin, sold by Hexion Specialty Chemicals, Inc. 180 East Broad Street, Columbus, Ohio 43215 (Hexion). This resin can be mixed with various chemical activators to provide various cure rates.

Methods for bonding the multilayer liner to metal substrates, including epoxy-coated substrates, are described in greater detail in copending application U.S. Ser. No. 61/449,756.

The liners described herein provide lined pipes with high abrasion-resistance and corrosion resistance for the conveyance of solids and slurries such as found in the agriculture, food and mining industries. The ionomer layer in the pipes provides very long lifetime, especially desirable for those industries that require long service lifetime due to the great maintenance and replacement complexity and cost. For example, oil slurry mining operations require kilometers of slurry pipelines in extreme environments, such as northern Alberta, Canada, so extended pipe lifetime is very desirable. Other mining operations that include the transport of highly abrasive particulate or slurry streams from the mine to processing refinery include, for example, iron ore, coal and coal dust, and the like, and in further non-mining transport processes, such as grain, sugar and the like.

EXAMPLES

The following Examples are intended to be illustrative of the invention, and are not intended in any way to limit its scope.

Melt Index (MI) or Melt Flow Rate (MFR) was measured by ASTM D1238 at 190° C. using a 2.16 kg mass, unless indicated otherwise. A similar ISO test is ISO 1133. Shore D hardness was measured according to ASTM D2240 or ISO 868.

Materials Used

HDPE: Sclair® 2907 a 0.96 density, 4.9 MI, high density polyethylene with a Vicat softening point of 129° C. (ASTM D 1525) and shore D hardness of 65 supplied by NOVA Chemicals Inc. 1555 Coraopolis Heights Road, Moon Township, Pa. 15108, U.S.A.

ION-1: a poly(ethylene-co-n-butyl acrylate-co-methacrylic acid) containing 9 weight % methacrylic acid and 23.5 weight % n-butyl acrylate based on the total weight of the parent acid terpolymer, the carboxylic acid groups neutralized to about 51 mole % to salts of zinc ions, with an MI of about 0.6 to 0.8 g/10 min and a Shore D hardness of 40.

ION-2: a poly(ethylene-co-methacrylic acid) with 15 weight % methacrylic acid, the carboxylic acid groups neutralized to about 58 mole % to salts of zinc ions with MI of about 0.7 g/10 min and Shore D hardness of 64.

ION-3: a poly(ethylene-co-methacrylic acid) with 15 weight % methacrylic acid, the carboxylic acid groups neutralized to about 59 mole % to salts of sodium ions with MI of about 0.9 g/10 min.

ION-4: a poly(ethylene-co-methacrylic acid) with 15 weight % methacrylic acid, the carboxylic acid groups neutralized to about 23 mole % to salts of zinc ions with MI of about 5 g/10 min.

ION-5: a poly(ethylene-co-n-butyl acrylate-co-methacrylic acid) containing 9 weight % methacrylic acid and 23.5 weight % n-butyl acrylate based on the total weight of the parent acid terpolymer, the carboxylic acid groups neutralized to about 49 mole % to salts of magnesium ions, with an MI of about 1.0 g/10 min.

ION-6: a poly(ethylene-co-isobutyl acrylate-co-methacrylic acid) containing 10 weight % isobutyl acrylate and 10 weight % methacrylic acid based on the total weight of the parent acid terpolymer, the carboxylic acid groups neutralized to about 73 mole % to salts of zinc ions, with an MI of about 1.0 g/10 min.

EAC-1: a poly(ethylene-co-methacrylic acid) with 9 weight % methacrylic acid, with MI of about 2.5 g/10 min.

EAC-2: a poly(ethylene-co-methacrylic acid) with 11.5 weight % methacrylic acid, with MI of about 1.5 g/10 min.

EAC-3: a poly(ethylene-co-n-butylacrylate-co-methacrylic acid) containing 10 weight % n-butylacrylate and 10 weight % methacrylic acid based on the total weight of the parent acid terpolymer, with MI of about 10 g/10 min.

MAPE-1: a maleic anhydride modified metallocene lldpe (ethylene-hexene) polyethylene graft copolymer, with MI of about 2 g/10 min. and melting point of 118° C., available commercially under the Fusabond® tradename from DuPont.

MAPE-2: a maleic anhydride modified ethylene elastomer graft copolymer, with melt flow rate of about 23 g/10 min., measured at 280° C. using a 2.16 kg mass, available commercially under the Fusabond® tradename from DuPont.

MAPE-3: a maleic anhydride modified high density polyethylene graft copolymer, with MI of about 12 g/10 min. and melting point of 131° C., available commercially under the Fusabond® tradename from DuPont.

MAPE-4: a maleic anhydride modified linear low density polyethylene graft copolymer, with MI of about 1.75 g/10 min. and melting point of 120° C., available commercially under the Fusabond® tradename from DuPont.

MAPE-5: a maleic anhydride modified metallocene lldpe (ethylene-hexene) polyethylene graft copolymer, with MI of about 2.7 g/10 min. and melting point of 118° C., available commercially from DuPont.

TPV-1: a thermoplastic vulcanizate (TPV), Density of 0.960 g/cm$^3$ (ISO 1183), Hardness Typical Value Unit Test Based On Shore Hardness (Shore A, 73° F., 0.0787 in, ISO 868) of 78, available commercially as Santoprene™ 271-73 from ExxonMobil 13501 Katy Freeway, Houston, Tex. 77079-1398.

PU-1: a 0.25 inch (6.3 mm) thick polyurethane sheet commercially available from the McMaster Carr Supply Company 6100 Fulton Industrial Blvd. SW Atlanta, Ga. 30336-2853, catalogue number 8789K423, with a Durometer rating of 80 on the Shore A scale and 30 Shore D (measured).

NR-1: natural rubber with 1 weight % Kevlar® reinforcing fibers.

Epoxy-1: an epoxy/urethane two part epoxy primer where the activator (or hardener) and base are blended at a volume ratio of 1 part activator to 3 parts hardener, sold as SP-2888RG by Specialty Polymer Coatings, #101 20529 62nd Avenue, Langley BC V3A 8R4.

Epoxy-2: an undiluted clear difunctional bisphenol A/epichlorohydrin derived liquid epoxy resin, sold as Epon™ 828 by Hexion.

IPDA: Isophorone diamine CAS number 2855-13-2, supplied by DuPont.

Silica: Fumed Silica, CAS number 112945-52-5, supplied by Sigma Aldrich.

A blend comprising 600 grams of Epoxy-2 and 12 grams of fumed silica was prepared on a Hamilton Beach Commercial Blender model 1C911 (Hamilton Beach/Proctor Silex Washington N.C. 27889). The fumed silica and epoxy base were mixed for about a minute initially to develop a uniform dispersion. Prior to removing material from the blender, the mixture was blended again for 10 to 20 seconds. The blend of Epoxy-2 and fumed silica is referred to in the tables as "Blend A". Blend A was mixed with IPDA to provide a stoicheometric ratio of equivalent weights. "Equivalent weight" is in the case of the Blend A, corrected for presence of 2 weight % of fumed silica, per mole of epoxy units (185 g). In the case of IPDA it is the weight required to react with one mole of epoxy units (42.6 g).

Thickness and diameter in the following tables, unless specifically indicated, are in inches (1 inch=2.54 cm). "NM" stands for "not measured."

Abrasion Resistance Testing

Samples of various materials were tested for abrasion resistance according to the following Slurry Jet Erosion (SJE) test procedure.

The SJE test is generally used to evaluate the abrasion resistance performance of a material working in a slurry environment. The wear from a slurry jet is affected by many factors such as jet speed, distance, impingement angle, sand concentration and nature of the sand in the slurry. Since the size, form and hardness of the slurry particles may vary from among applications, this test is often used for comparison and reference.

The test apparatus used consisted of a test chamber, connection pipes, a pump, a heater, a flow meter and a temperature controller.

Before and after the SJE test, the samples (2.5 by 2.5 by 0.63 cm) were conditioned in a vacuum oven for 24 to 48 hours until the moisture levels were constant and their weights measured with a precision balance (accuracy 0.1 mg).

The results in Table 1 were measured using a 10% mixture of AFS silica sand in water at 50° C. using a 4 mm diameter nozzle diameter, distance of sample to nozzle of 100 mm, 16 m/s jet velocity, 90° impingement angle and 2 hour exposure period. The temperature of the slurry was kept at 50° C. through a heater and a temperature controller. A typical wear mark from a 90° impingement angle was a round depression with a center peak that is below the original surface but above the level of the outer ring. The dimensions of the wear mark can be measured with a laser profile scanner. Weight loss was measured after a period of drying and then weight loss was converted to a volume loss based on wear layer density. Table 1 also includes a measure of the Shore D hardness as per ASTM D2240 "Standard Test Method for Rubber Property—Durometer Hardness" using at PTC Instruments model 307L. The Shore D measures and Slurry Jet Erosion wear results are summarized in Table 1.

TABLE 1

| Material | Density (kg/m$^3$) | Shore D | Measured Weight loss (mg) | Calculated Volume loss (mm$^3$) |
|---|---|---|---|---|
| Steel | 7800 | | 557.3 | 71.4 |
| HDPE | 954 | 62 | 32.8 | 34.4 |
| ION-1 | 960 | 40 | 4.3 | 4.5 |
| ION-2 | 970 | 64 | 22.4 | 23.1 |
| ION-5 | 950 | 43 | 6.1 | 6.4 |
| ION-6 | 960 | 55 | 16.3 | 17.0 |
| MAPE-1 | 926 | 54 | 12 | 13.0 |
| MAPE-2 | 870 | 18 | 4.2 | 4.8 |
| MAPE-5 | 920 | 52 | 11.4 | 12.4 |
| PU-1 | 1050 | 30 | About 1 | 1 |
| NR-1 | 1000 | 25 | 5.3 | 5.3 |
| TPV-1 | 970 | 20 | 3.7 | 3.8 |

Rubbery polymers or elastomers have excellent resistance to the erosion caused by slurry jet wear. Samples with wear rates less than about 5 mm$^3$ after the two hours of exposure are potential candidates for hydroslurry transport. Terpolymer ionomer ION-1, MAPE-2, polyurethane PU-1, TPV-1 and natural rubber with Kevlar® all appear to be promising candidates for the wear layer in this test. Another terpolymer ionomer, ION-5, was only slightly less effective in this test. These wear rates are an order of magnitude lower than the steel, which lost over 70 mm$^3$ of volume during the same 2-hour test period.

Chemical Resistance and Moisture Permeation

Selected materials were also tested for chemical resistance using a procedure similar to ASTM D570 (Water Absorption). Chemical resistance of the materials was evaluated through naphtha and bitumen aging. For the naphtha test, material samples were immersed in petroleum ether (A.C.S Reagent grade) in a sealed glass bottle and kept at room temperature for 24 hours. Weight and dimension change before and after the test was measured. For the bitumen test, the material samples were kept in bitumen froth in a sealed steel container for 7 days at 50° C. Any change of material properties was measured and recorded. Because the bitumen was very sticky and difficult to completely remove from the surface of the samples, dimension changes were used to estimate if any bitumen had been adsorbed into the sample.

Resistance to moisture permeation is very important in the hydroslurry application, and the moisture vapor permeation value (MVPV) was measured for thin films prepared from the various liner samples at 38° C. and 100% RH according to the ASTM F1249 Standard Test Method for Water Vapor Transmission Rate (MVTR) Through Plastic Film and Sheeting Using a Modulated Infrared Sensor and normalized for the film thickness. The chemical resistance test results and moisture permeation results are summarized in Table 2.

TABLE 2

| | Chemical Resistance Tests | | |
|---|---|---|---|
| Material | Bitumen 7 days at 70° C. volume gain, % | Naphtha 7 days at ambient weight gain, % | MVPV gm-mil/[100 in$^2$-day] |
| HDPE | 0 | 2.3 | 0.3-0.4 (literature values) |
| ION-1 | 10.1 | 34.4 | 3.9 |
| ION-2 | 1.1 | 8.8 | 1.0 |
| ION-5 | 9.5 | 33.6 | NM |
| ION-6 | 5.7 | 16.9 | 1.6 |
| MAPE-1 | 0.5 | 6.2 | 0.35 |
| MAPE-2 | NM | >100 | 2.0 |
| MAPE-5 | 0.8 | 7 | 0.7 |

TABLE 2-continued

Chemical Resistance Tests

| Material | Bitumen 7 days at 70° C. volume gain, % | Naphtha 7 days at ambient weight gain, % | MVPV gm-mil/[100 in²-day] |
|---|---|---|---|
| PU-1 | NM | 4 | 1.5 to 5 (literature values) |
| NR-1 | NM | 50.8 | NM |
| TPV-1 | NM | 10.1 | 4 |

For use in the wear layer, terpolymer ionomers ION-1 and ION-5 had good or very good performance in the slurry jet test, but had relatively poor resistance to bitumen (10% volume gain) and naphtha (34% weight gain). NR-1 and MAPE-2 also had poor performance in these chemical resistance tests. Dipolymer ionomer ION-2 showed very little volume change when exposed to bitumen (1% volume change) and could be used as an interior layer to resist permeation of the bitumen. Analysis of the bitumen used in the tests showed it contained naphtha at concentrations in the ppm range. Only the HDPE sample was relatively unaffected by the 24 hours of exposure to naphtha at ambient temperature, but it had poor performance in the SJE abrasion test. In some parts of the extraction process to separate the bitumen from the sand, mineral spirits like naphtha may be added to the process stream to enhance the bitumen recovery from the sand. In those parts of the separation process where naphtha may be present at concentrations of greater than 1%, it may be desirable to include an interior layer in the polymer liner that has good naphtha resistance like HDPE.

Dipolymer ionomer ION-2 and HDPE also had low MVPV. The combination of low water permeability and resistance to bitumen and naphtha make these materials useful as interior barrier layers when combined with a good wear layer such as a terpolymer ionomer. The dipolymer ionomer ION-2 could be incorporated as a interior layer using ionomer ION-1 as the first surface wear layer and ION-1 as the second surface adhesive layer without the need to include a tie layer between the surface and interior layers. If HDPE was used as an interior barrier layer a tie layer would be included between the surface layer and interior layer.

Mechanical Properties

TABLE 3

| Material | Flexural Modulus at 21° C. (MPa) | Young's Modulus at 21° C. (MPa) | Tensile Strength at 10% yield (MPa) | Melting Point (° C.) |
|---|---|---|---|---|
| steel | NM | 2.08 × 10¹² | NM | 1370 |
| HDPE | 100 | 1000 | 26 | 131 |
| ION-1 | 29.6 | 34 | 1.18 | 70 |
| ION-2 | 330 | 582 | 16.5 | 86 |
| ION-5 | 59 | NM | NM | 70 |
| ION-6 | 330 | 203 | 7.12 | 85 |
| MAPE-1 | NM | NM | NM | 118 |
| MAPE-2 | NM | NM | 9.25 | 43 |
| MAPE-5 | NM | NM | NM | 115 |
| PU-1 | NM | NM | NM | * |
| NR-1 | NM | NM | 0.51 | * |
| TPV-1 | NM | NM | 0.68 | 201 |

* Thermoset (no melting point)

For use in the interior core layer, HDPE and dipolymer ionomers provided good stiffness, as indicated by flexural modulus. They also had relatively high melting points, which provide dimensional stability at elevated temperatures. Also as shown in Table 2, they had good to excellent barrier to moisture permeation. Polyurethane and rubber, which had good properties in the SJE and chemical resistance tests, are thermoset materials, not thermoplastic, making them unsuitable for easy preparation of multilayer liners.

Adhesion Testing

In each of the Examples, a 0.25 inch (6.4 mm) thick cold rolled steel plate 6 inch by 6 inch (152 mm by 152 mm) in dimension was sandblasted on one side to white metal and wiped clean with paper towels. Within 24 hours of sandblasting and cleaning, the steel plate was bonded to a 6 inch by 6 inch (152 mm by 152 mm) piece of test liner using the Plate Bonding Procedure described below. Plates were also coated with epoxy coatings and the epoxy coatings were partially cured as described below prior to bonding with the liner.

The steel plate was prepared and then roll coated with Epoxy-1 using the 3:1 volume ratio of base to hardener. Similarly, the steel plate was prepared and then roll coated with a mixture of Blend A and IPDA. Blend A and IPDA were stirred together on a weight basis of 185 parts of Blend A and 42.6 parts of IPDA and then roll coated onto the steel plate. The epoxy coating thickness was nominally 0.01 inch (0.25 mm) thick. After being partially cured overnight at ambient temperature, the epoxy coated plates were bonded to the test liners according to the Plate Bonding Procedure.

Plate Bonding Procedure

A Carver press sold by Carver Inc., 1569 Morris St., PO Box 544, Wabash, 1N, 46992-0544, was used to bond the liners to the prepared steel plates. The top platen was set at 190° F. (88° C.) and the bottom platen set at 303° F. (150° C.). Test assemblies were assembled from top to bottom: fluoropolymer coated release cloth sheet, steel plate, liner material with the adhesive layer facing the plate, and fluoropolymer coated release cloth sheet. The assembly was put into the press, with the steel plate facing down. A 2600-gram aluminum block (nominally 152 mm by 152 min by 30 mm) was placed on top of the upper release sheet. The press was closed and tightened until the gauge registered 600 lbf (2669 N) which was one of the smallest scale increments on the inside black scale on the gauge attached to Carver Press. The platen area of the press is 81 in² (0.052 m²) and the steel plate/liner bonding area was 36 in² (0.0232 m²) so a force of 600 lbf (2669 N) generated by the press provided a pressure at the ionomer/prepared steel interface of 600 lbf/36 in² or about 17 lbf/in² (115 kPa). The sample was heated for 8 minutes. The press was opened and the aluminum block was removed. The sample, kept between the release sheets, was removed and placed between two room temperature aluminum blocks and allowed to slowly cool for 5 minutes.

Table 4 provides a summary of temperature readout and bonding time for a run. The data were used to estimate the interface temperature between the epoxy coated steel and ionomer liner during the bonding process in the Carver Press. The maximum temperature reached in this test was 138° C. Presuming that there are slight sample to sample variations in the installation of the thermocouples, the maximum interface temperature was assumed to be about 140° C.

TABLE 4

| Time (minutes) | Temperature (° C.) | |
|---|---|---|
| | Plate | Liner |
| 0.5 | 66 | 56 |
| 1 | 88 | 72 |
| 1.5 | 101 | 86 |
| 2 | 110 | 95 |
| 2.5 | 116 | 103 |

TABLE 4-continued

| Time (minutes) | Temperature (° C.) | |
|---|---|---|
| | Plate | Liner |
| 3 | 120 | 109 |
| 3.5 | 125 | 114 |
| 4 | 128 | 118 |
| 4.5 | 130 | 124 |
| 5 | 132 | 127 |
| 5.5 | 133 | 130 |
| 6 | 134 | 131 |
| 6.5 | 135 | 132 |
| 7 | 136 | 133 |
| 7.5 | 137 | 134 |
| 8 | 138 | 135 |

The resulting liner bonded to the plate was then cut into 1 inch (25.4 mm) wide by 6 inch (152.4 mm) long test coupons. By clamping the coupon in a vise and then driving a chisel between the liner and the steel it was possible to peel back the first approximately 50 mm of liner from the steel backing along the 152 mm length. With the tab exposed, the coupon was loaded into an Instron Model 33R4469 (sold by Instron Worldwide Headquarters, 825 University Ave, Norwood, Mass. 02062-2643), equipped with a load cell set at 2000 lb (8896 N), tension cell and crosshead speed set at 4.0 inch/min (102 mm/min). The coupon was clamped in place horizontally and the exposed tab pulled vertically to approximate a 90° peel.

The 90° peel test measures the force (lbf) to pull the liner tab away from the steel surface. The forces acting on a tab during the 90° peel are complicated because the tab must make the 90° bend so the outside of the 90° bend is under stress and the inside is under compression. To simplify analysis of the 90° peel test, we assumed the tab was under simple shear stress. If the strength of adhesion of a sample to the substrate exceeds the tensile yield of the material, the sample will stretch and eventually break rather than peel. As the liner thickness increases, the cross-sectional area of the tab increases and consequently more force would be required to exceed the tensile yield of the tab.

A 25 mm wide by 150 mm long test coupon prepared from ION-1 may be used as an example. The tensile yield of a test coupon of ION-1 at 23° C. is reported to be 3.5 MPa (508 psi) and tensile strength is reported to be 15.9 MPa (2306 psi). A monolayer 25 mm wide by 2 mm thick liner sheet cross-section of ION-1 would be expected to start elongating at 175 N (40 lbf) and break if the tensile load exceeded 795 N (178 lbf). A similar liner 6 mm thick would start to elongate at 525 N (118 lbf) and break at 2423 N (544 lbf).

Table 5 summarizes the sample materials, tensile yield and the estimated force at which a 2-mm or 6-mm by 25-mm tab of the material would be expected to elongate (Column labeled "Force"). The reported bond strengths for the substrates listed are the approximate average force exerted on the tension cell to maintain the 102 mm/min crosshead speed over 50 mm of peel. "TB" indicates that the tab broke before any peel initiated and indicates that the tensile strength of the tab was less than bond strength between liner and substrate.

TABLE 5

| | | | 2 mm × 25 mm tab | | | 6 mm × 25 mm tab | | |
|---|---|---|---|---|---|---|---|---|
| | Tensile | | Bond Strength (N) | | | Bond Strength (N) | | |
| Sample | Yield (MPa) | Force (N) | Steel | Epoxy 1 | Blend A + IPDA | Force (N) | Steel | Epoxy 1 | Blend A + IPDA |
| ION-1 | 3.5 | 175 | 178 | TB | 178 | 525 | 445 | TB | 636 |
| ION-2 | 13.8 | 690 | NM | TB | 245 | 2070 | NM | TB | 71 |
| ION-3 | 15.2 | 760 | NM | NM | 116 | 2280 | NM | NM | NM |
| ION-4 | 12.4 | 620 | NM | 98 | 214 | 1860 | NM | 98 | 254 |
| EAC-1 | 25* | NM | NM | TB | 98 | NM | NM | TB | 93 |
| EAC-2 | 9.6 | 480 | NM | TB | 467 | 1440 | 129 | TB | 405 |
| EAC-3 | 4.7 | 235 | NM | NM | 173 | 705 | 227 | NM | 556 |
| MAPE-3 | 26 | 1300 | TB | NM | NM | 3900 | NM | NM | None |
| MAPE-4 | NM | NM | 165 | NM | 142 | NM | NM | NM | NM |

*Ultimate tensile strength

The bond strength results in Table 5 indicate ION-1 was the best adhesive under these bonding conditions. In the case of the 2-mm thick adhesive layer of ION-1 bonded to sandblasted steel, the bond strength was 178 N per 25 mm wide tab or 100% of the tensile strength at yield for ION-1. On the steel primed with Epoxy-1, the 2-mm thick adhesive layer of ION-1 had a peel strength that exceeded its tensile yield strength. On the 2-mm thick adhesive layer of ION-1 bonded to steel primed with Epoxy A activated with IPDA, the peel strength was 178N, about 100% of the tensile strength at yield for ION-1. Increasing the thickness of the ION-1 layer from 2 mm to 6 mm produced the same kind of peel strength results when bonded to steel (85% of Tensile Strength at Yield), or when bonded to steel primed with epoxy 1 (Tab Break) or when bonded to steel primed with Epoxy Blend A activated with IPDA (120% of Tensile). The 90° peel strength between the prepared steel and ION-2 also looked promising in that tab breaks were noted between ION-2 and Epoxy-1. However, the bond between ION-2 and the steel coated with the blend of Epoxy A activated with IPDA was relatively weak. While under certain conditions ION-2 can produced strong bonds to prepared steel, ION-1 gives a more robust adhesive for bonding to prepared steel.

The bond strength results for the steel or epoxy primed steel with EAC-2 or EAC-3 also looked promising. The strong bonds measured on the 6 mm thick coupons of EAC-2 and EAC-3 to the blend of Epoxy A activated with IPDA suggests that these types of copolymers with higher methacrylic acid contents may be useful adhesives.

For some of these bonding conditions the anhydride modified adhesives MAPE-3 and MAPE-4 also provided strong bonds.

An example liner has a three layer construction comprising a nominally 0.01 inch (0.25 mm) to 0.07 inch (1.8 mm) adhesive layer comprising ION-1, 0.23 inch (5.8 mm) to 0.29 inch (7.4 mm) of core layer comprising ION-2 and 0.1 to 0.2 inch (2.5 to 5.1 mm) of innermost layer comprising ION-1.

Two processes were used to prepare the nominally 0.4 inch (10 mm) thick liner used in the adhesion tests.

In the first process, monolayer 0.1 inch (2.5 mm) thick by nominally 20 inch (500 mm) wide sheets of ION-1 and ION-2 were extruded into sheets separately. A third sheet, 20 inch (500 mm) wide, was made by coextruding ION-1 and ION-2 into a two layer structure with an overall thickness of 0.1 inch (2.5 mm) where 70% of the thickness was made up of an ION-1 layer and 30% of the thickness was made up of an ION-2 layer. Subsequently, individual sheets were stacked on top of each other and then thermally laminated together to build up a 0.4 inch thick sheet. A MPL-24 HC thermal laminator made by Glenro, Inc 1100 E 3rd Street, Maysville, Ky. 41056 was used to bond adjacent layers. Typical operating conditions were a belt speed of 0.3 m/min., a nip pressure of 0 to 200 kPa and heater temperatures of 170 to 180° C. On the first pass through the laminator, two monolayer films of ION-2 were bonded together. Then a layer of ION-1 was added to the bottom of the stack and the structure passed through the laminator a second time. On the third pass, the previously laminated sheet was flipped over and the co-extruded sheet was added to the bottom of the stack so that the ION-2 layer on the co-extruded sheet was in contact with ION-2 in the stack. This liner sheet comprised a 0.1 inch (2.5 mm) thick "wear" layer of ION-1, a 0.23 inch (6.3 mm) thick interior layer made up of ION-2 and a 0.07 inch (1.8 mm) thick "adhesive" layer of ION-1. The laminated sheet, in random lengths from 1 meter to 3 meters by 500 mm wide, was trimmed using a bandsaw to give squares or rectangles for either bonding onto plates or rolling or seaming into tubes.

A liner material was also prepared using a cast sheet co-extrusion process to make an "A-B-A" co-extrusion with one extruder melting and pumping the "A" layers comprising ION-1 and a second extruder melting and pumping the "B" layer comprising ION-2. The sheet extrusion equipment was supplied by Welex Incorporated (1600 Union Meeting Rd 200 Industrial Blvd, Blue Bell, Pa. 19422 USA) fitted with a Cloeren die supplied by Cloeren Incorporated, 401 16th Street, Orange, Tex. 77630 U.S.A. The line had a 6-inch single screw extruder with gear pump feeding the core "B" layer of the feed block and a 4.5-inch single screw extruder feeding the "A" surface layers. The Cloeren die was externally deckled from 130 inches to about 90 inches. The upward travelling vertical stack had 32-inch diameter chrome rolls. The 90-inch (228 cm) wide coextruded sheet, produced at 1.2 ft/min (0.37 m/min), was in-line trimmed to 1.84 meter wide sheet that had an "adhesive" layer nominally 0.09-inch thick (2.3 mm) layer of ION-1, a 0.2-inch thick (5 mm) interior or core layer of ION-2 and a second surface "wear" layer of ION-1 that was 0.09 inch (2.3 mm) thick.

This liner material was adhered to epoxy-treated steel plates. The steel plate was prepared and then roll coated with Epoxy-2 using the 3:1 volume ratio of base to hardener. The epoxy coating thickness was nominally 0.01 inch (0.25 mm) thick. After being cured overnight at ambient temperature, the plate was bonded to the liner using the Plate Bonding Procedure. The average peel strength was 188 lbf/in (836 N/25 mm).

This liner exhibited very good stability properties at temperature at or above the melting point of the ION-1 because the core layer holds the structure together. Coupons of the liner bonded to epoxy coated steel conditioned in an 85° C. water bath showed no significant loss in adhesion between ionomer and epoxy coated steel, when the sample was removed from the water and allowed to cool to ambient condition prior to the peel. The bond was also very good after water exposure when the sample was pulled hot at 70° C.

The liner sheet prepared as described above was cut into a rectangle with various lengths with the width controlled to 18 to 18.75 inches (457 to 476 mm). The sheet was then rolled widthwise and then extrusion welded where the edges touched to seam the rolled sheet into a tube with a nominal outside diameter of 6.25 inches (159 mm). An extrusion welder (available from Wegner Welding, 16W301 S. Frontage Rd., Burr Ridge, Ill. 60527) and rod shaped pieces of ION-1 were used to seam the two edges of the rolled sheet.

The steel pipe used in the following Example was "6-inch" welded steel pipe, sandblasted to white metal and wiped clean prior to epoxy coating. Nominal dimensions for this type of pipe have an outer diameter (OD) of 6.625 inches and an inner diameter (ID) of 6.343 inches, according to the trade book *IPT's Pipe Trades Handbook* by Robert Lee, published by IPT Publishing and Training Ltd Edmonton Alberta, February 2008. 15.5 inch (394 mm) length of 6-inch steel pipe was sandblasted, cleaned and then epoxy coated by spray coating with Epoxy-2 at the 3:1 base to hardener volume ratio. To reduce the viscosity for spray coating, to the 3 to 1 blend of Base and hardener an additional one part of dimethyl carbonate was added. The spray coated pipe was allowed to partially cure overnight prior to bonding to the liner.

The seamed liner was approximately 3 inches (76 mm) longer than length of pipe spool to allow 1.5 inch (38 mm) to extend out of each end of the steel spool. The liner OD was slightly smaller than the ID of the epoxy coated steel pipe. Since the pipe ID was 6.3 inches (160 mm), the liner OD was about 6.25 inches (159 mm).

The liner was bonded to the pipe using the following Bladder Bonding Process.

Bladder Bonding Process

Materials used:

Rubber bladder 4.5 inch (114 mm) OD×4 inch (102 mm) ID rubber tubing (reference part no #800161) available from Tidland Corporation, 2305 SE 8th Avenue, Camas, Wash. 98607. The bladder comes with metal endcaps, one of which has a fitting that permits inflating the bladder.

Corrosion-resistant Viton® rubber sheet, 0.25 inch (6.4 mm) thick and of varying length, the width selected to match the ID of the liner tube. Sixteen inch (406 mm) wide sheet was used for the 6-inch diameter steel pipe.

Fluoropolymer coated release cloth.

Strap heater that tightly fit to outside of 6-inch diameter pipe (OD 6.63 inch). The heater was 12 to 18 inches long, 120 V, 1200 W.

A Barnant Controller Model 689-0010 was used to control the temperature of the strap heater.

The liner, release cloth, rubber sheet and bladder (listed from outside to inside) were assembled inside the coated pipe spool. The strap heater was attached around one end of steel pipe and connected to the temperature controller. A thermocouple taped or clamped to the surface of the steel pipe under the area heated by the strap heater was used to measure the temperature.

The bladder was inflated to 10 to 12 psig (69 to 83 kPa). The power to the strap heater was turned on and the set-point on the Barnant Controller set at 150° C. to heat the steel pipe.

Once the actual steel pipe temperature reached the set-point temperature of 150° C., the temperature was held for another 25 to 60 minutes. After the elapsed hold time, the controller was turned off and the power supply to controller and heater was unplugged. The strap heater was moved one full strap heater length down the pipe and the heating and holding process was repeated until the entire length of steel pipe between the flanges had been heated.

To bond the liner to the epoxy coated steel, a strap heater set-point of 150° C. with a hold time of 60 minutes was used. Two 1 inch (25.4 mm) wide coupons were removed and tested for adhesion strength.

Adhesion Testing

The liner bonded to pipe was cut into 1 foot (305 mm) lengths and then ripped in half lengthwise using a Hyd-Mech S-20 series 2 Horizontal Band Saw. Then a 1 inch (25.4 mm) wide strip was removed from one edge of the half pipe. The 12 inch (305 mm) long by 1 inch (25.4 mm) wide strip is cut in half to give two 6 inch (152 mm) by 1 inch (25.4) test coupons. By hand the first two inches of liner were peeled away from the epoxy coated steel by clamping the coupon in a vise and then using a chisel or screw driver to separate the liner from the epoxy coated steel coupon. Once the first two inches of liner were separated from the coupon, an Instron Model 33R4469 peel tester was used to measure the force required to peel the remaining 4 inches (102 mm) of liner from the epoxy coated steel plate using a cross head speed of 4 inches/min (102 mm/min).

The first coupon had an average bond of 240 lbf/in (1068 N/25 mm). The second coupon was found to have an average bond of 200 lbf/in (890 N/25 mm).

Another example liner has a three layer construction comprised of a nominally 0.01 inch (0.25 mm) to 0.07 inch (1.8 mm) adhesive layer comprising MAPE-3, 0.37 to 0.5 inch (9.4 mm to 12.7 mm) of core layer comprising ION-2 and 0.12 to 0.25 inch (2.5 to 5.1 mm) of innermost layer comprising ION-1.

The invention claimed is:

1. A thermoplastic multilayer structure in the form of a tubular article or pipe liner comprising at least three layers,
   (a) a first surface layer having a thickness of about 6.3 to about 51 mm comprising a soft thermoplastic composition consisting of an ionomer of an ethylene acid terpolymer comprising an E/X/Y copolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid and Y is present in from 3 to 45 weight % of the E/X/Y copolymer and represents copolymerized units of a softening comonomer selected from alkyl acrylate, alkyl methacrylate, wherein the alkyl groups have from 1 to 8 carbon atoms, or vinyl acetate, wherein about 40 to about 75% of the carboxylic acid groups in the copolymer are neutralized to salts wherein the cations consist of zinc cations with melting point in a range from about 60 to about 220 ° C., with flexural modulus determined at 21 ° C. according to ASTM D790 of less than or equal to 90 MPa and Shore D hardness (ASTM D2240) from about 30 to about 50;
   (b) a second surface layer comprising a thermoplastic polymer composition containing acid functionality, an ionomer thereof, or anhydride functionality with flexural modulus determined at 21 ° C. according to ASTM D790 of less than 100 MPa and melting point in a range from about 60 to about 100 ° C., wherein the composition comprises
      (1) a polyolefin graft copolymer comprising a trunk polymer comprising polyethylene, polypropylene, styrene-ethylene-butene-styrene triblock copolymer, polybutadiene or a copolymer comprising copolymerized units of ethylene and copolymerized units of vinyl acetate, alkyl acrylate or alkyl methacrylate; wherein the alkyl groups have from 1 to 8 carbon atoms, wherein the trunk polymer is modified by grafting thereto a cyclic anhydride of $C_4$-$C_8$ unsaturated acids; or
      (2) an ethylene dicarboxylic random copolymer comprising copolymerized units of ethylene and copolymerized units of a dicarboxylic comonomer selected from the group consisting of cyclic anhydrides of $C_4$-$C_8$ unsaturated acids monoesters of $C_4$-$C_8$ unsaturated acids having at least two carboxylic acid rows diesters of $C_4$-$C_8$ unsaturated acids having at least two carboxylic acid groups, and mixtures thereof, wherein the ethylene dicarboxylic copolymer comprises from about 0.3 to about 20 weight % copolymerized units of dicarboxylic comonomer, based on the weight of the random copolymer; or
      (3) an ethylene acid terpolymer comprising an E/X/Y copolymer wherein E represents copolymerized units of ethylene, X is present in an amount of about 2 to about 30 weight % of the E/X/Y polymer and represents copolymerized units of a $C_{3-8}$ α,β-ethylenically unsaturated carboxylic acid, and Y is present in from 3 to 45 weight % of the E/X/Y copolymer and represents copolymerized units of a softening comonomer selected from alkyl acrylate, alkyl methacrylate, wherein the alkyl groups have from 1 to 8 carbon atoms, or vinyl acetate; or an ionomer thereof wherein about 40 to about 75% of the carboxylic acid groups in the terpolymer are neutralized to salts wherein the cations consist of zinc cations; or
      (4) an ethylene acid E/Z dipolymer wherein E represents copolymerized units of ethylene, and Z is present in an amount of about 10 to about 25 weight % of the E/Z diolymer and represents cool merized units of a $C_{3-8}$ α,β-ethylenically unsaturated carboxylic acid; and
   (c) at least one interior layer of a material selected from the group consisting of thermoplastic resin, fiber reinforcement, and metal and combinations thereof, wherein the thermoplastic resin comprises a composition with flexural modulus determined at 21 ° C. according to ASTM D790 of greater than 80 MPa, melting point in a range from about 75 to about 150 ° C., and moisture vapor permeation value less than 2 g-mil/100in$^2$-day; wherein the thermoplastic resin comprises
      (i) an ionomer of an E/W ethylene acid dipolymer wherein E represents copolymerized units of ethylene, W is present in an amount of about 2 to about 30 weight % of the E/W polymer and represents copolymerized units of a $C_{3-8}$ α,β-ethylenically unsaturated carboxylic acid, wherein about 40 to about 75% of the carboxylic acid groups in the dipolymer are neutralized to salts wherein the cations consist of zinc cations; or
      (ii) a polyethylene homopolymer, polyethylene copolymer, polypropylene homopolymer or polypropylene copolymer,
   wherein the second surface layer is adhered to the interior of a metal pipe having a thickness of about 6.3 to about 51 mm.

2. The multilayer structure of claim 1 wherein the interior layer comprises the ionomer of the E/W ethylene acid dipolymer.

3. The multilayer structure of claim 2 wherein the second surface layer comprises the ionomer of an ethylene acid terpolymer.

4. The multilayer structure of claim 1 wherein the interior layer consists of a polyethylene homopolymer, polyethylene copolymer, polypropylene homopolymer or polypropylene copolymer.

5. The multilayer structure of claim 4 comprising, in order, the first surface layer comprising the ionomer of the ethylene acid terpolymer, a first tie layer, the interior layer consisting of high density polyethylene or polypropylene, a second tie layer and the second surface layer comprising the ionomer of an ethylene acid terpolymer.

6. The multilayer structure of claim 1, wherein the $C_{3-8}$ α,β-ethylenically unsaturated carboxylic acid is acrylic acid or methacrylic acid.

7. The multilayer structure of claim 6 wherein X is methacrylic acid, present in an amount from 5 to 20 weight % of the E/X/Y copolymer and Y is butyl acrylate, present in an amount from 10 to 30 weight % of the E/X/Y copolymer.

8. The multilayer structure of claim 1 wherein the second surface layer comprises (1).

9. The multilayer structure of claim 1 wherein the second surface layer comprises (3).

10. The multilayer structure of claim 9 wherein X is methacrylic acid, present in an amount from 5 to 20 weight % of the E/X/Y terpolymer and Y is butyl acrylate, present in an amount from 10 to 30 weight % of the E/X/Y copolymer.

11. The multilayer structure of claim 9 wherein (3) is the E/X/Y terpolymer.

12. The multilayer structure of claim 11 wherein X is methacrylic acid, present in an amount from 5 to 20 weight % of the E/X/Y terpolymer and Y is butyl acrylate, present in an amount from 10 to 30 weight % of the E/X/Y copolymer.

13. The multilayer structure of claim 1 wherein (3) is the ionomer of the E/X/Y terpolymer.

* * * * *